United States Patent [19]

Berg

[11] Patent Number: 5,759,125
[45] Date of Patent: Jun. 2, 1998

[54] ECCENTRICALLY SUPPORTED TENSIONER

[75] Inventor: Gerald M. Berg, Lisbon, N. Dak.

[73] Assignee: Clark Equipment Company, Woodcliff Lake, N.J.

[21] Appl. No.: 668,549

[22] Filed: Jun. 21, 1996

[51] Int. Cl.⁶ .................................................. F16H 7/10
[52] U.S. Cl. ........................................ 474/112; 474/135
[58] Field of Search .......................... 474/94, 101, 112, 474/135

[56] References Cited

U.S. PATENT DOCUMENTS

| | | | |
|---|---|---|---|
| Re. 34,543 | 2/1994 | Komorowski | 474/135 |
| Re. 34,616 | 5/1994 | Komorowski et al. | 474/135 |
| 4,473,362 | 9/1984 | Thomey et al. | 474/135 |
| 4,557,709 | 12/1985 | St. John | 474/135 X |
| 4,568,318 | 2/1986 | Johnson et al. | 474/112 |
| 4,605,387 | 8/1986 | Okubo et al. | 474/112 |
| 4,634,407 | 1/1987 | Holtz | 474/112 |
| 4,725,260 | 2/1988 | Komorowski et al. | 474/135 |
| 4,767,383 | 8/1988 | St. John | 474/111 X |
| 4,808,148 | 2/1989 | Holtz | 474/112 |
| 4,824,421 | 4/1989 | Komorowski | 474/135 |
| 4,904,230 | 2/1990 | Kawashima et al. | 474/112 |
| 4,917,655 | 4/1990 | Martin | 474/112 |
| 5,078,656 | 1/1992 | Brandenstein et al. | 474/112 |
| 5,244,438 | 9/1993 | Golovatai-Schmidt | 474/112 |
| 5,256,112 | 10/1993 | Thomey et al. | 474/112 |
| 5,370,585 | 12/1994 | Thomey et al. | 474/112 |
| 5,391,119 | 2/1995 | Kondo et al. | 474/112 |
| 5,399,124 | 3/1995 | Yamamoto et al. | 474/94 |

*Primary Examiner*—Roger J. Schoeppel
*Attorney, Agent, or Firm*—Westman, Champlin & Kelly, P.A.

[57] ABSTRACT

A belt tensioner imparts tension to a belt of a machine and includes a support base and a fastener for adjustably securing the support base to the machine. A shaft is secured to the support base and an eccentric hub is operably coupled to the shaft for at least partial rotation about the shaft. A spring couples the eccentric hub to the support base. A pulley is rotatably coupled to the eccentric hub and engageable with the belt wherein engagement of the pulley with the belt and displacement on the support base on the machine at least partially rotates the eccentric hub about the shaft against the spring.

8 Claims, 6 Drawing Sheets

5,759,125

ECCENTRICALLY SUPPORTED TENSIONER

BACKGROUND OF THE INVENTION

This invention relates to an eccentrically support tensioner for maintaining tension in a drive belt. More particularly, this invention relates to a support system for loading a torsion spring in the eccentrically supported tensioner and a damper assembly for the eccentrically supported tensioner.

Belt tensioning devices are well known and exist in numerous forms. One common form of a belt tensioner includes an eccentrically supported tensioner. The tensioner includes a pulley support eccentrically supported on a support shaft. A pulley is rotatably mounted on the pulley support through a rolling contact bearing. The pulley support is provided with a cylindrical portion concentric with the support shaft. The support shaft is fixed to a base such as an engine block. A torsion spring coupled between the pulley support and the fixed base tends to rotate the pulley support about the support shaft to develop tension in the belt.

It is often desirable to preload the torsion spring so that as the belt wears or stretches, force is maintained by the tensioner on the belt. U.S. Pat. No. 5,078,656 provides a hexagonal socket in the pulley support. The hexagonal socket receives an adjusting tool such as an Allen wrench that is used to preload the spring.

SUMMARY OF THE INVENTION

An eccentrically supported tensioner of the present invention preloads a torsion spring simply through displacement of a support base. The tensioner imparts tension to a belt of a machine and includes a fastener for adjustably securing the support base to the machine. A shaft is secured to the support base. An eccentric hub is operably coupled to the shaft for at least partial rotation about the shaft. A pulley is rotatably coupled to the eccentric hub and engageable with the belt. A force is stored in the torsion spring when the support base is displaced on the machine to at least partially rotate the eccentric hub about the shaft against the torsion spring.

In a preferred embodiment, a damper assembly reduces or inhibits oscillatory movement of the eccentric hub about the support shaft. The damper assembly includes a first friction plate secured to the eccentric hub for rotation therewith, and a second is friction plate secured to the support shaft. A spring element urges the first friction plate against the second friction plate. At least one guide pin extends through an aperture in the first friction plate and is secured to the eccentric hub. The guide pin prevents rotation of the first friction plate about the support shaft, while allowing translational displacement of the first friction plate along the axis of the support shaft.

DETAILED DESCRIPTION OF THE PREFERRED EMBODIMENTS

Figure 1:
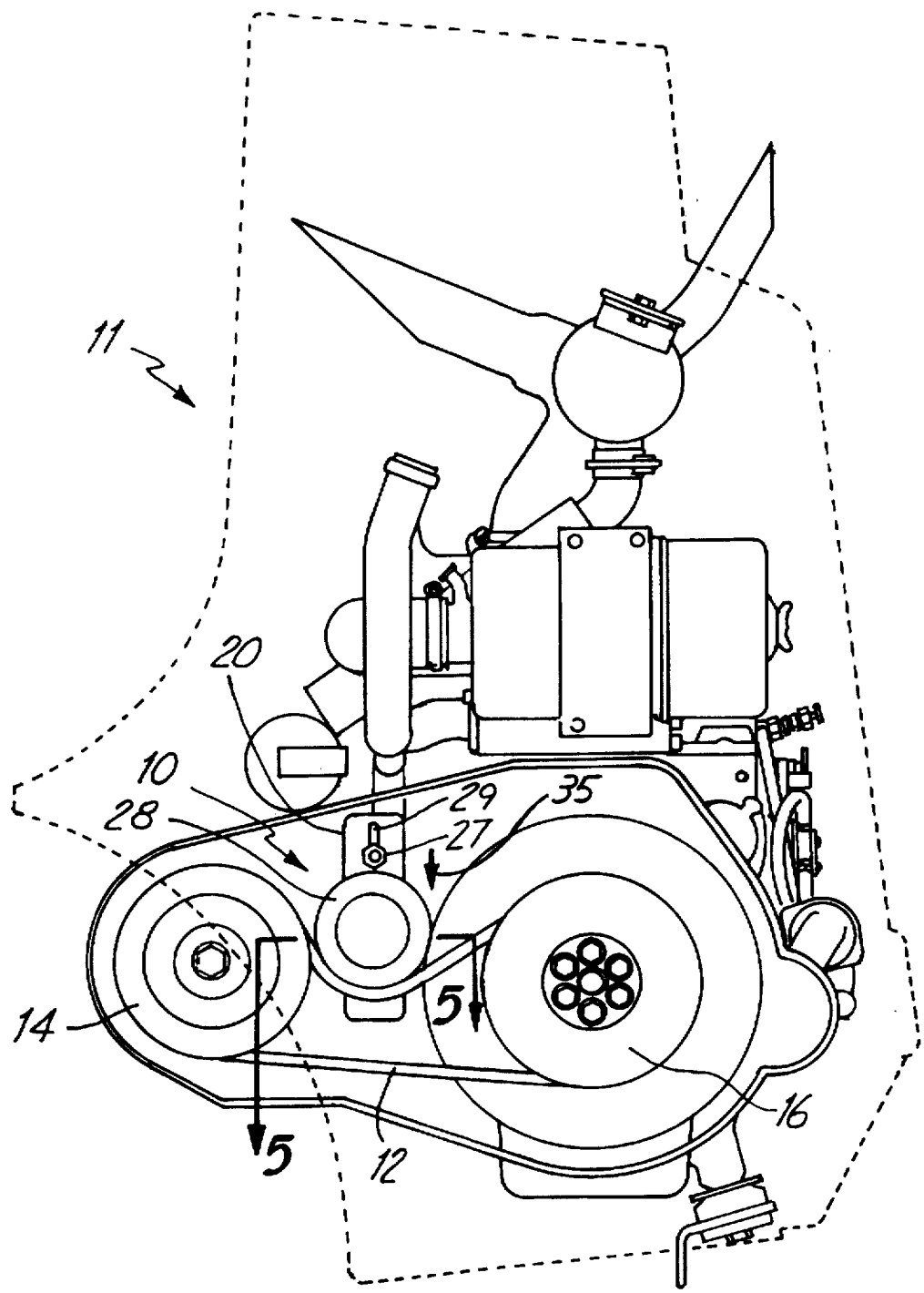
FIG. 1 is a schematic view of a belt system having an eccentrically supported tensioner of the present invention in a first position.

An embodiment of a tensioner of the present invention is illustrated in FIG. 1 at 10 mounted to a machine such as an engine shown generally at 11. The tensioner 10 imparts tension to a belt 12, which is running over a plurality of pulleys indicated at 14 and 16. In the embodiment illustrated, the tensioner 10 applies an inwardly directed biasing force to the belt 12 to prevent the belt 12 from slipping over the pulleys 14 and 16 as the belt 12 wears or stretches.

Figure 1A:
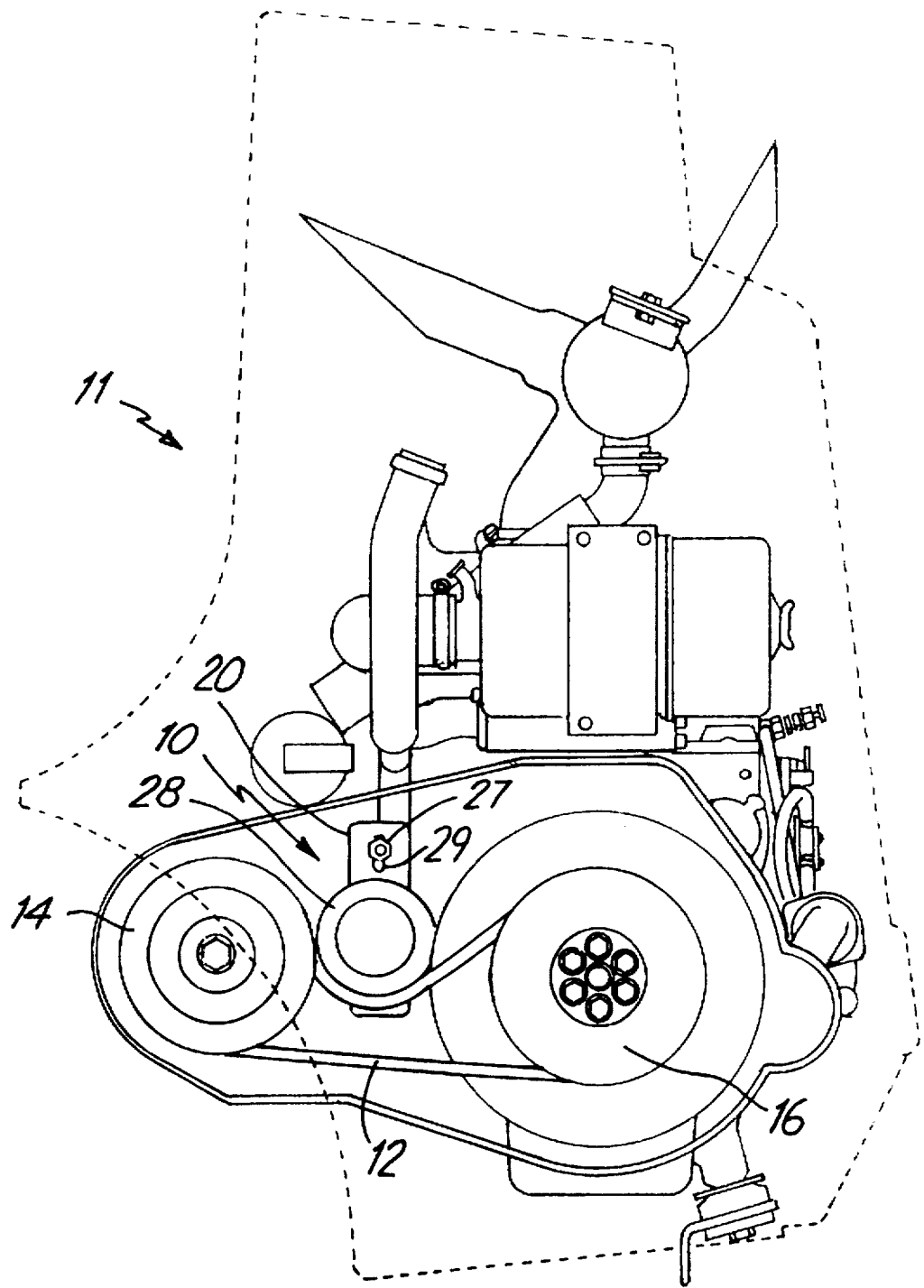
FIG. 1A is a schematic view of the belt system having the eccentrically supported tensioner of the present invention in a second position.
Figure 2:
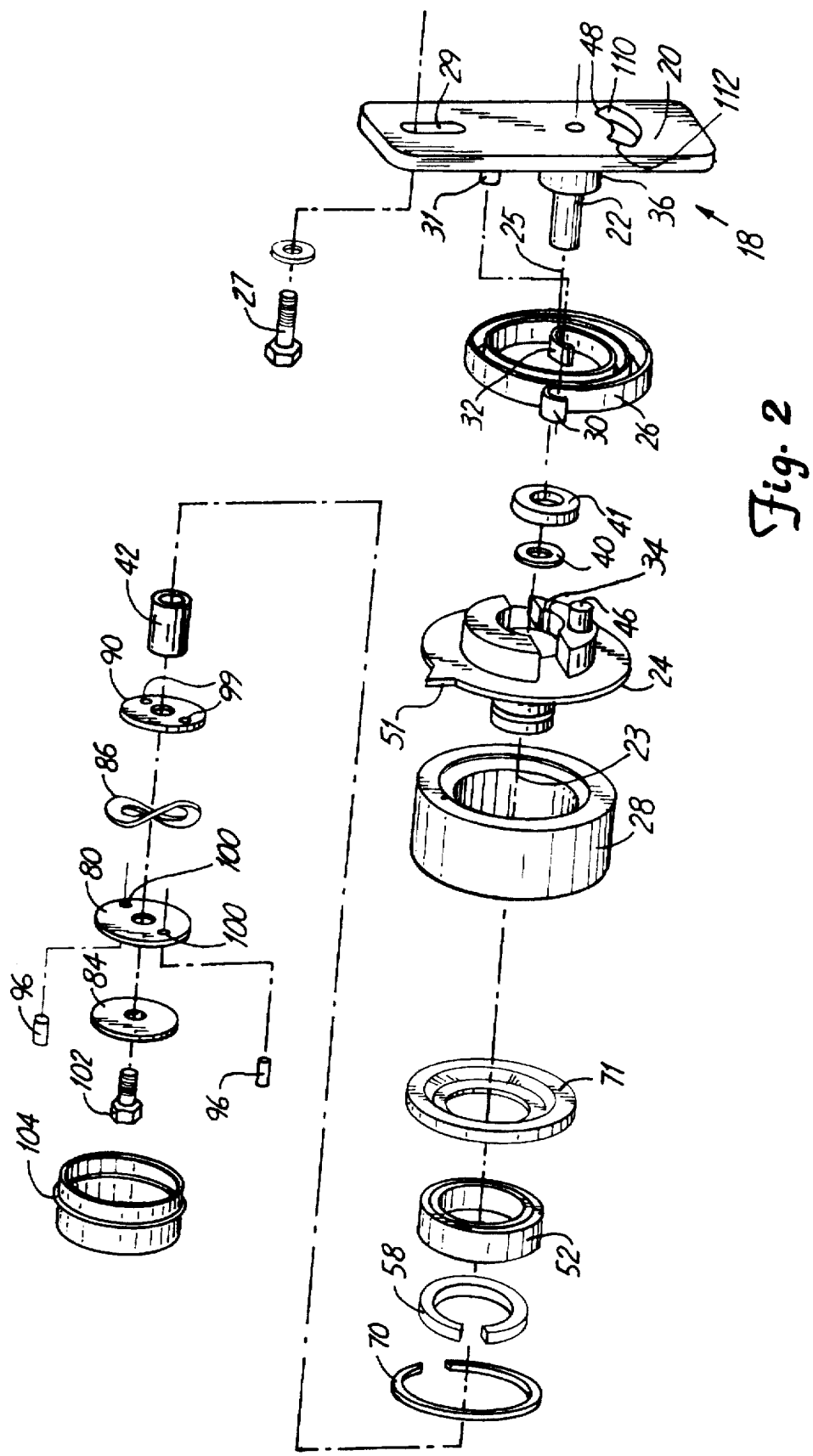
FIG. 2 is an exploded, perspective view of the eccentrically supported belt tensioner.
Figure 5:
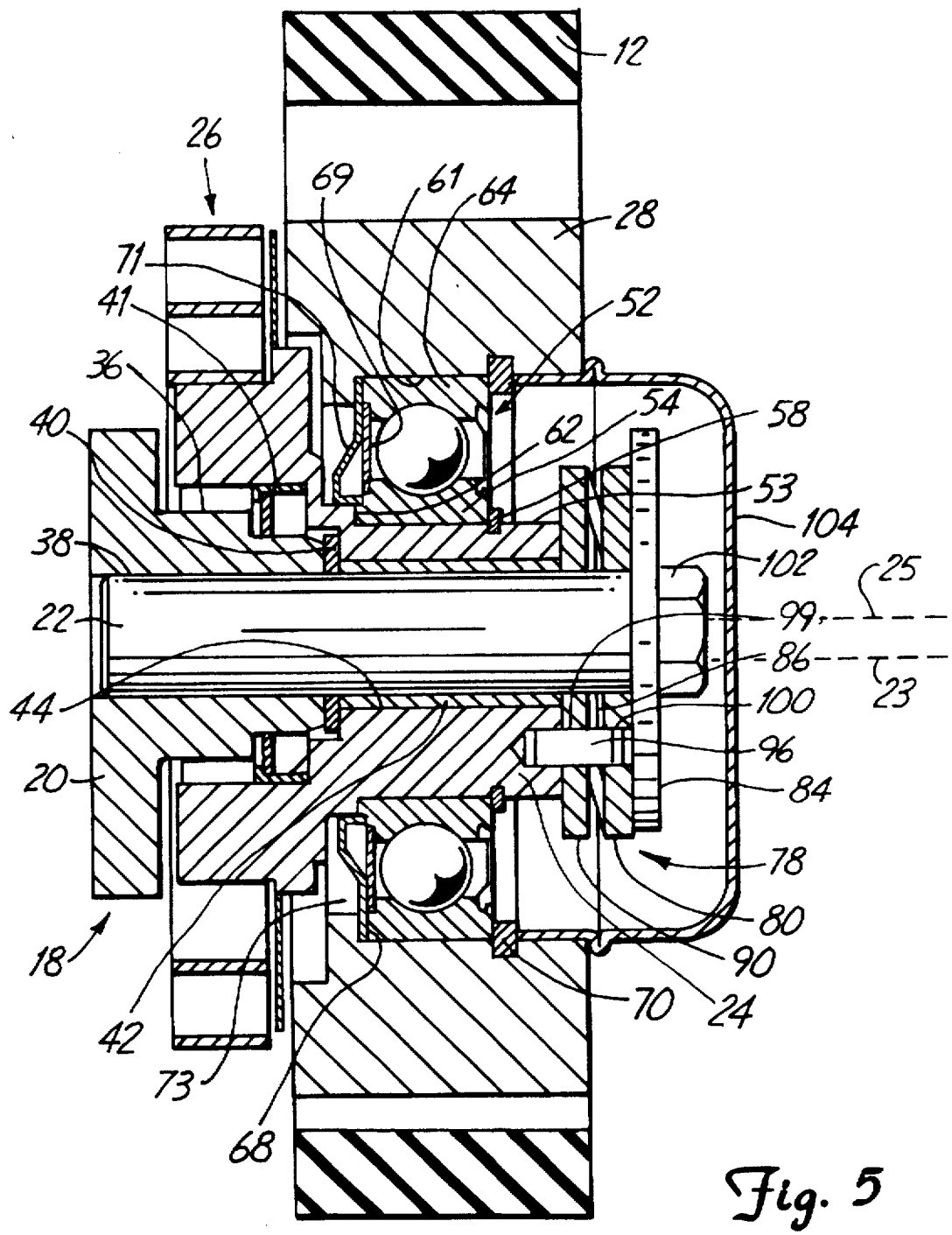
FIG. 5 is a sectional view of the eccentrically supported tensioner taken along lines 5—5 in FIG. 1.

Referring to FIGS. 2 and 5, the tensioner 10 includes a support structure 18 having a support base or bracket 20 with means for adjustably securing the bracket 20 to the engine 11. The support structure 18 includes a support shaft 22 secured to or integrally formed with the bracket 20. An eccentric hub 24, having an axis 23 offset from an axis 25 of the support shaft 22, is operably coupled to the support shaft 22 for at least partial rotation about the support shaft 22. A spring 26 is coupled to the support structure is and the eccentric hub 24, which when loaded, urges the eccentric hub 24 to rotate about the support shaft 22. A pulley 28 is rotatably coupled to the eccentric hub 24 and engages the belt 12. A spring force is stored in the spring 26 when the pulley 28 engages the belt 12 as the bracket 20 is moved toward the belt 12. In particular, as the bracket 20 is moved on the engine 11 in a direction indicative by arrow 35 in FIG. 1 to a position illustrated in FIG. 1A, the eccentric hub 24 rotates at least partially about the support shaft 22 against the spring 26. In the embodiment illustrated, the bracket 20 includes a slot 29. A bolt 27 extends through the slot 29 to adjustably secure the bracket 20 to the engine 11 when the desired force has been stored in the spring 26.

Figure 3:
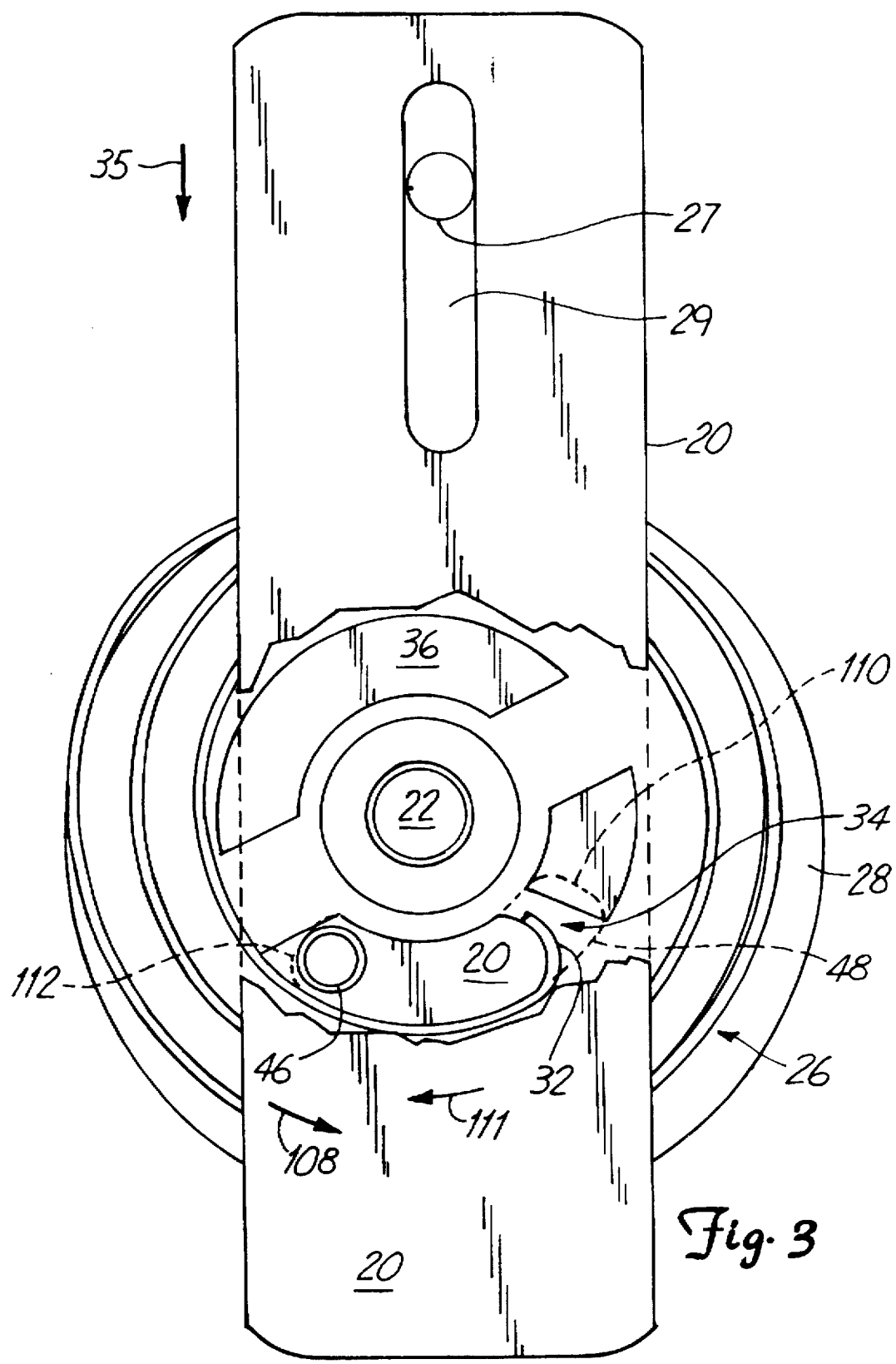
FIG. 3 is a rear elevational view of the eccentrically supported tensioner with parts broken away.

Referring to FIGS. 2 and 3, the spring 26 comprises a torsion spring. The torsion spring 26 has a first end 30 secured to the support structure 18 using a peg 31 attached to the bracket 20. The spring 26 extends from the end 30 about the support shaft 22 for a number of turns and has an end 32 secured to the eccentric hub 24 and disposed in a recess 34. The spring 26 is formed in a manner to urge rotation of the eccentric hub 24 about the support shaft 22 in order to displace the axis 25, and thus, the pulley 28 about the axis 23 and toward the belt 12 to maintain tension in the belt 12.

Figure 4:
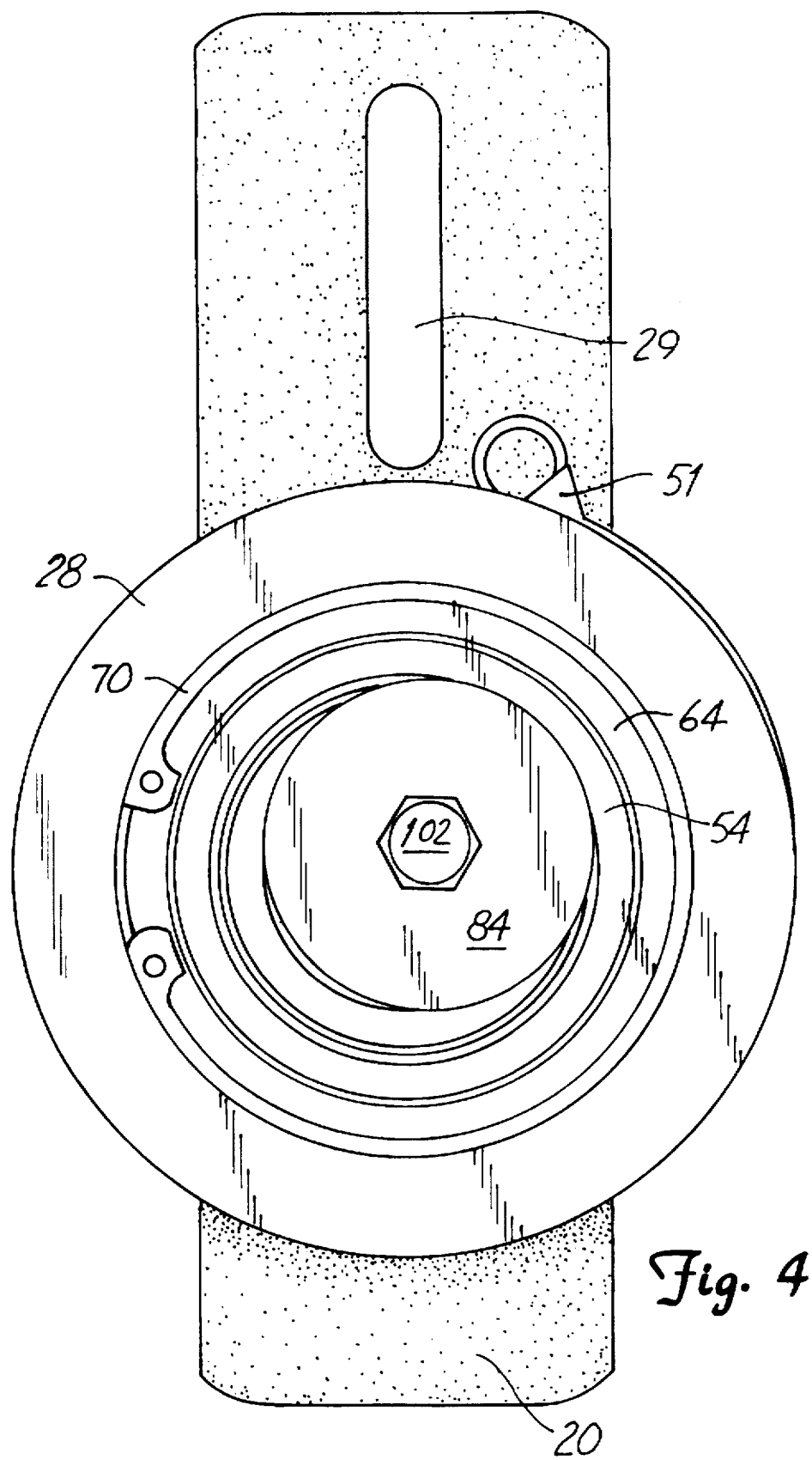
FIG. 4 is a front elevational view of the eccentrically supported tensioner.

Referring to FIGS. 2 and 5, the bracket 20 includes an extending portion 36 having a bore 38 that receives the support shaft 22. A thrust bearing 40 is provided on an end of the extending portion 36 about the bore 38. A sleeve bearing 42 is interposed between the support shaft 22 and an inner surface of a bore 44 extending through the eccentric hub 24. The thrust bearing 40 and the sleeve bearing 42 allow at least partial rotation of the eccentric hub 24 about the support shaft 22. A seal 41 is provided between the extending portion 36 and the eccentric hub 24 to prevent dirt or other contaminates from reaching the thrust bearing 40 and the sleeve bearing 42. Referring also to FIG. 3, a stop pin 46 is secured to the eccentric hub 24 and extends into an arcuate slot 48 provided in the bracket 20. The stop pin 46 limits rotation of the eccentric hub 24 about the support shaft 22. In view that the position of the stop pin 46 can not be observed in the slot 48 when the tensioner 10 is mounted to the engine 11, a pointer 51 is provided on the eccentric hub 24 as illustrated in FIG. 4. The pointer 51 indicates the position of the stop pin 46 in the slot 48, and thus, the relative position of the eccentric hub 24 on the support structure 18.

Referring back to FIGS. 2 and 5, a bearing assembly 52 is interposed between the eccentric hub 24 and the pulley 28. An inner race 54 of the bearing assembly 52 is disposed about an eccentric portion 53 of the eccentric hub 24. A snap ring 58 secures the inner race 54 against an annular flange 62. An outer race 64 of the bearing assembly 52 is disposed against an inner surface 61 of the pulley 28. A snap ring 70 secures the outer race 64 against an inner annular flange 68. A bearing grease seal is indicated at 69. A metal dust seal 71 is trapped between the outer race 64 and an annular inner surface of the pulley. The dust seal 71 extends toward and seals against the inner race 54. An annular void 73 is filled with grease to further prevent dust from reaching the bearing assembly 52.

A damper assembly 78 reduces or inhibits oscillatory movement of the eccentric hub 24 about the support shaft 22. The damper assembly 78 includes a first friction plate or washer 80 secured to the eccentric hub 24 for rotation therewith, and a second friction plate or washer 84 secured to the support shaft 22. In the embodiment illustrated, a spring element 86 (wave spring) urges the first friction plate 80 against the second friction plate 84. The spring element 86 is interposed between the first friction plate 80 and a support washer 90 that is secured against the eccentric hub 24. At least one and preferably two guide pins 96 (one of which is illustrated in FIG. 5) are secured to the eccentric hub 24 and extend through apertures 99 in the support washer 90 and into apertures 100 provided in the first friction plate 80. The guide pins 96 prevent rotation of the first friction plate 80 about the support shaft 22 while allowing translational displacement of the first friction plate 80 along the axis of the support shaft 22. A bolt 102 extends through the second friction plate 84 and is threaded into the support shaft 22 to hold the damper assembly 78 together. A cover 104 is removably attached to the pulley 28.

As stated above, the spring 26 is loaded with displacement of the bracket 20 on the engine 11. Referring to FIG. 3, displacement of the bracket 20 in a direction indicated by arrow 35 loads the spring 26 and causes rotation of the eccentric hub 24 in a direction indicated by arrow 108. The eccentric hub 24 rotates about the support shaft 22 until the stop pin 46 contacts an end 110 of the arcuate slot 48. When a sufficient amount of force has been stored in the spring 26, the bracket 20 is fastened securely to the engine 11 using the bolt 27. As the belt 12 wears or stretches, the spring 26 maintains tension in the belt 12 through rotation of the eccentric hub 24 in a direction indicated by arrow 111.

Engagement of the stop pin 46 with an end 112 of the arcuate slot 48 limits rotation of the eccentric hub 24.

Although the present invention has been described with reference to preferred embodiments, workers skilled in the art will recognize that changes may be made in form and detail without departing from the spirit and scope of the invention.

What is claimed is:

1. A belt tensioner for imparting tension to a belt of a machine, the belt tensioner comprising:
   a support structure comprising:
      a rigid support base having a longitudinal slot for allowing translational displacement of the support base to adjustably secure the support base to the machine;
      a shaft secured to the support base;
   an eccentric hub operably coupled to the shaft for at least partial rotation about the shaft;
   a first spring coupled to the support structure and the eccentric hub; and
   a pulley rotatably coupled to the eccentric hub and engageable with the belt wherein engagement of the pulley with belt and translational displacement of the support base on the machine displaces the support shaft relative to the machine and at least partially rotates the eccentric hub about the shaft against the spring and drives the pulley into engagement with the belt.

2. The belt tensioner of claim 1 and a damper operably coupled to the eccentric hub and the support structure.

3. The belt tensioner of claim 2 wherein the damper includes a first plate joined to the eccentric hub and a second plate joined to the shaft and slidably engageable with the first plate.

4. The belt tensioner of claim 3 wherein the damper includes a second spring operably connected to the first plate for urging engagement between the first plate and the second plate.

5. The belt tensioner of claim 4 wherein the second spring is operably connected to the support structure to urge the first plate against the second plate.

6. The belt tensioner of claim 3 and a stop for limiting rotation of the eccentric hub about the shaft.

7. The belt tensioner of claim 6 wherein the stop includes a pin secured to the eccentric hub and extending into and displaceable in a slot formed in the first plate.

8. The belt tensioner of claim 7 wherein the damper includes a second spring operably connected to the support structure and the first plate for urging the first plate against the second plate.

* * * * *